United States Patent [19]

Imanaka et al.

[11] 4,008,345
[45] Feb. 15, 1977

[54] PROCESS FOR FIRE-PROOFING TREATMENT OF SHAPED ARTICLES OF AROMATIC POLYAMIDES

[75] Inventors: Yoshihiko Imanaka, Hino; Hiroshi Uchiyama, Matsuyama, both of Japan

[73] Assignee: Teijin Limited, Osaka, Japan

[22] Filed: Sept. 24, 1974

[21] Appl. No.: 508,907

[30] Foreign Application Priority Data

| Oct. 5, 1973 | Japan | 48-112115 |
| Nov. 26, 1973 | Japan | 48-131627 |
| Feb. 25, 1974 | Japan | 49-21371 |

[52] U.S. Cl. .................. 427/381; 106/15 FP; 252/8.1; 428/272; 428/474; 428/921; 427/379

[51] Int. Cl.² .................................... B05D 3/02

[58] Field of Search ............ 117/138, 138.8 N; 106/15 FP; 252/8.1; 427/381, 379; 428/276, 474, 538, 920, 921, 272

[56] References Cited

UNITED STATES PATENTS

| 2,482,755 | 9/1949 | Ford et al. ............... 428/276 |
| 2,606,115 | 8/1952 | Nuessle et al. .......... 252/8.1 |
| 3,253,881 | 5/1966 | Donahue et al. ........ 252/8;1 |
| 3,549,307 | 12/1970 | Hirsch ..................... 260/78 |
| 3,562,197 | 2/1971 | Sears et al. .............. 252/8.1 |
| 3,576,590 | 4/1971 | Hirsch ..................... 260/78 |
| 3,576,769 | 4/1971 | Hirsch et al. ............ 260/78 |
| 3,607,798 | 9/1971 | Hirsch ..................... 260/78 |
| 3,723,074 | 3/1973 | Sears et al. .............. 106/15 |
| 3,896,250 | 7/1975 | Miller ..................... 428/921 |
| 3,900,664 | 8/1975 | Miller ..................... 428/921 |

*Primary Examiner*—Harry J. Gwinnell
*Assistant Examiner*—Sadie L. Childs
*Attorney, Agent, or Firm*—Sherman & Shalloway

[57] ABSTRACT

A process for fire-proofing treatment of shaped articles of aromatic polyamides which comprises contacting a shaped article of an aromatic polyamide with an aqueous solution of a phosphorus-containing inorganic compound free from halogen and sulfur, drying it and then post heat-treating it; characterized in that said shaped article is contacted with an aqueous solution of a treating compound selected from the group consisting of halogen- and sulfur-free, phosphorus-containing inorganic acids and their ammonium, amine and urea salts in a concentration of about 2 to about 30% by weight, dried at a temperature of not more than about 150° C., and then post heat-treated at a temperature of about 300° C. to about 450° C.

7 Claims, No Drawings

PROCESS FOR FIRE-PROOFING TREATMENT OF SHAPED ARTICLES OF AROMATIC POLYAMIDES

This invention relates to a process for fire-proofing treatment of shaped articles of aromatic polyamides which can impart improved properties such as fire-proofness, acid resistance or solvent resistance permanently to the shaped articles of aromatic polyamides while retaining their good strength. More specifically, the invention relates to a process for fire-proofing treatment of shaped articles of aromatic polyamides which comprises contacting a shaped article of an aromatic polyamide with an aqueous solution containing a treating compound selected from the group consisting of halogen- and sulfur-free, phosphorus-containing inorganic acids, ammonium salts thereof, amine salts thereof and urea salts thereof in a concentration of about 2 to about 30% by weight, drying the shaped article at a temperature of not more than about 150° C., and then heat-treating the shaped article at a temperature of about 300° C. to about 450° C.

Aromatic polyamides are valuable material because of their superior physical properties such as high thermal stability, Young's modulus and tenacity. Shaped articles of thermally stable aromatic polyamids in the form of films, fibers, fabrics, and other articles have the above superior properties, but are desired to have more improved properties in respect of solvent resistance, especially sulfuric acid resistance, and fire-proofness. Various methods have heretofore been proposed with a view to affording these improvements.

For example, U.S. Pat. No. 3,576,769 issued Apr. 27, 1971 discloses the controlled heat-treatment in air of shaped articles of thermally stable aromatic polyamides. According to this proposal, the shaped article is heated from room temperature (about 25° C.) to a temperature in the range of from about 250° C. to 500° C. over a period of from about 45 minutes to 1 hour. When the maximum desired temperature is reached, the heat-treatment of the shaped article is continued at this temperature for a period of time ranging from 25 minutes to about 12 hours. This method brings about an improvement in acid resistance and fire-proofness over the original non-heat treated shaped article, but the improvement is still unsatisfactory. Furthermore, the method requires a careful control involving a fairly complicated operation, and if the control fails, the strength retention of the shaped article is reduced. Non-uniformity of control also results in poor reproducibility of the improved quality.

Subsequent to the above proposal, some techniques were developed to heat-treat the shaped article in the presence of various treating agents. For example, U.S. Pat. No. 3,576,590 issued Apr. 27, 1971 discloses aromatic polyamide shaped articles, such as fibers, which can be converted to dimensionally stable fire-proof products by constructive heat treatment at elevated temperatures with elemental sulfur under controlled conditions. This second proposal is a gaseous phase treatment, and suffers from the disadvantage that the treating conditions are complicated and a uniform treatment is difficult to achieve. In addition, attempts to improve fire-proofness to a satisfactory degree inevitably result in the deterioration of the inherent physical properties of the shaped article. There is still another defect that noxious sulfur oxide gases are generated as a result of combustion.

As a third proposal, U.S. Pat. No. 3,607,798 discloses a process for the conversion of thermally stable aromatic polyamide-shaped articles into dimensionally stable fire-proof products which involves a constructive heat-treatment at elevated temperatures in an elemental halogen-containing atmosphere under carefully controlled conditions. Since the process is also carried out in the gaseous phase, it suffers from the same disadvantages as in the case of U.S. Pat. No. 3,576,769. Also, this process causes the evolution of noxious halogen gases, which may lead to the deterioration of the physical properties of the shaped articles.

Japanese Patent Publication No. 5436/72 published Feb. 16, 1972 discloses a process for treating aromatic polyamide-shaped articles at elevated temperatures in a gas or vapor of a halide or oxyhalide of an element of Group IV, V or VI of the periodic table under carefully controlled conditions. The treating agent used in this fourth proposal includes a halide and an oxyhalide of phosphorus. But since this treating agent is easily decomposable even upon contact with moisture in the air, it lends itself to troublesome handling. Furthermore, since the treatment must be carried out in the gaseous phase in an inert gas, this method is neither free from the disadvantagesinherent to gaseous phase treatments, and from the generation of noxious gases. In addition, attempts to impart satisfactory fire-proofness frequently result in the deterioration of the inherent physical properties of the shaped article.

Belgian Patent No. 795,977 laid open on August 27, 1973 discloses a process for imparting fire-proofness to poly(m-phenylene isophthalamide). This process includes an embodiment of using a phosphoric acid, preferably ortho-phosphoric acid or pyrophosphoric acid, in addition to the use of a solvent solution of elemental white phosphorus. This Application states that conveniently 85 percent otho-phosphoric acid is used although higher or lower concentrations are also useful. However, in all of the Examples, the concentration of phosphoric acid used is 85 percent. This Application give Example 1 in which the aromatic polyamide article is contacted with a 85% phosphoric acid solution, and then dried with heated air to the boiling point (about 158° C.) of the phosphoric acid, and Example 2 in which the article is heated in an oven at 75° C. after the contact. However, the Application fails to state any post-treatment which is carried out at a higher temperature after the drying. Furthermore, apparently because of the absence of the recognition of post heat-treatments at higher temperatures, this Application states that although the flame-proofing treatment of this invention initially results in fabrics having an oxygen index of at least 40, this value has been found to decrease as a result of repeated washing of the treated fabric. Furthermore, this fifth proposal shows that in order to remove the above defects, a flame-proofing material such as polyvinylidene chloride or an organic perfluorinated polymer (for example, Teflon, trademark) should be coated, and gives an example in which such a post-coating operation is carried out.

It will be readily understood that a method requiring such a post-coating step is disadvantageous, and if the method cannot impart permanent or durable fire-proofness without such a post coating step, the fire-proofness is dominated by the coating material used. It is clear that when the post-coating is not performed, it is impossible to impart permanent or durable fire-proofness.

The inventors made extensive investigations in an attempt to remove the disadvantages or defects of the above-described conventional techniques. As a result, they found that permanent or durable fire-proofness can be imparted to a shaped article of an aromatic polyamide with operating advantage and good reproducibility of quality as well as with good strength retention by contacting the shaped article with an aqueous solution containing a phosphorus compound selected from halogen- and sulfur-free, phosphorus-containing inorganic acids, and their ammonium, amine and urea salts (which embraces phosphoric acid used in the above-mentioned fifth proposal) in a concentration of as low as about 2 to about 30% thereby to cause the aqueous solution to be absorbed in the shaped article, drying the shaped article at a temperature of not more than about 150° C., and then post heat-treating it at a temperature of about 300° to about 450° C., preferably for a time period of not more than about 60 minutes.

This result is unexpected in view of the fact that the above-mentioned fifth proposal teaches that while the use of elemental white phosphorus or phosphoric acid in a concentration of as high as 85% can impart a temporary fire-proofness to a shaped article of an aromatic polyamide, coating of another resin having fire-proofness and durability on the shaped article is necessary in order to impart durable fire-proofness.

The inventors also found that according to the treating process of this invention, the post-coating step required in the fifth proposal above is quite unnecessary, and other defects of the prior art techniques mentioned above such as the complicated and difficulty-controllable gaseous phase treatment, the generation of noxious gases, and the substantial deterioration in the properties of the shaped article as a result of the fire-proofing treatment can be eliminated.

Accordingly, it is an object of this invention to provide a process for fire-proofing treatment of shaped articles of aromatic polyamides which has eliminated the disadvantages and defects of the conventional methods described above, and can impart improved properties such as durable fire-proofness or acid resistance to the shaped articles without impairing their inherent physical properties. Many other objects of this invention along with its advantages will become apparent from the following description.

According to the process of this invention, shaped articles of aromatic polyamides such as films, sheets, fibers, filaments, tows, yarns, or fabrics are treated.

The aromatic polyamides are well known, and can be prepared by any known methods. These aromatic polyamides are known polymers in which at least 15 mol% of bonding units for bonding aromatic rings in an amide bond, and the bonding units may contain an ether bond, an ester bond, an imide bond, a hydrazide bond, an azo bond, a sulfone bond, a sulfonamide bond, an imidazole bond, an oxazole bond, a thiazole bond, a triazole bond, an oxadiazole bond, or a combination of two or more of these bonds. These aromatic polyamides are substantially linear aromatic polyamides whose aromatic rings may contain a substituent such as a halogen atom, a nitro group, a hydroxyl group, a carboxyl group, a lower alkyl group, or a lower alkoxy group. For use in this invention, the aromatic polyamides are selected from those known aromatic polyamides which furthermore have a melting point such that the polyamide does not melt by post heat-treatment at a temperature of about 300° to about 450° C. Examples of these aromatic polyamides that can be used in this invention are aromatic polyamides, aromatic polyamideimides, aromatic polyamide esters, aromatic polyamide benzimidazoles, and aromatic polyamide sulfones all of which may have such a substituent as exemplified above on their aromatic ring.

Specific examples of these aromatic polyamides are those containing the following recurring units either alone or in combination. In the following formulae, the substituent on the aromatic ring is omitted for simplicity.

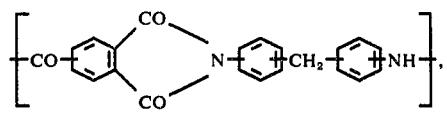

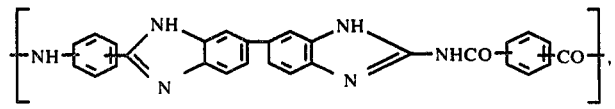

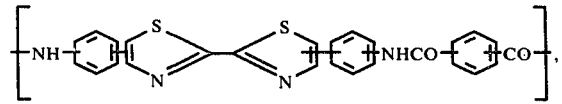

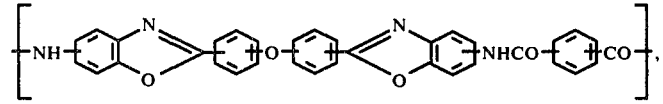

-continued

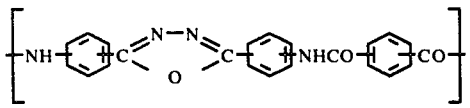

More specific examples of the aromatic polyamides containing these units are the following aromatic polyamides which may contain such a substituent as illustrated above.

Poly(m-phenylene isophthalamide),
Poly(m-phenylene terephthalamide),
Poly(p-phenylene terephthalamide),
Poly(p-benzamide),
Copoly(m-phenylene isophthalamide.terephthalamide),
Copoly(m-phenylene p-phenylene.isophthalamide), and
Copoly(m,p-benzamide).

According to the process of this invention, the shaped article of aromatic polyamide is contacted with an aqueous solution containing a compound selected from the group consisting of phosphorus-containing inorganic acids free from halogen and sulfur, and their ammonium, amine and urea salts in a concentration of about 2 to about 30% by weight, and then dried at a temperature of not more than about 150° C.

The contact between the shaped article and the aqueous solution can be effected, for example, by immersing the shaped article in the aqueous solution or by coating or spraying the aqueous solution on the shaped article. The aromatic polyamide shaped article thus impregnated with the aqueous solution, if desired, is squeezed by a mangle, or the take-up of the aqueous solution is adjusted by similar means. Usually, it is recommended that the shaped article is impregnated with the above aqueous solution so that the amount of the above compound after drying is about 0.5 to about 20% by weight based on the weight of the shaped article.

The concentration of the aqueous solution of the above compound used in this invention is about 2 to about 30% by weight, preferably about 5 to about 20% by weight, higher concentrations beyond the upper limit specified above cannot be used because such excessive concentrations result in a marked deterioration in the properties of the polyamide shaped article by drying and post heat-treatment. Aqueous solutions having lower concentrations than the lower limit specified above are inconvenient because they afford a feasible treating effect.

The aromatic polyamide shaped article contacted with the aqueous solution of the compound is then dried at a temperature of not more than about 150° C. Drying can be carried out also at room temperature, but the use of heating means such as hot water, infrared heating or heating oven is efficient. Drying at a temperature above about 150° C. is not preferred since it often causes the deterioration of the physical properties of the shaped article.

Examples of the halogen- and sulfur-free, phosphorus-containing inorganic acids are oxy acids of phosphorus such as ortho-phosphoric acid, polyphosphoric acid, phosphorus acid, pyrophosphorus acid or hypophosphorous acid. Examples of the ammonium salts of these inorganic acids are primary ammonium ortho-phosphate, secondary ammonium phosphite, ammonium polyphosphate and ammonium pyrophosphate.

Examples of the amine salts of these inorganic salts include ortho-phosphoric acid dihydrogen dimethylamine salt, ortho-phosphoric acid dihydrogen n-butylamine salt, ortho-phosphoric acid dihydrogen hexamethylene diamine salt, phosphorous acid dihydrogen aniline salt, and polyphosphoric acid dimethyl amine salt.

Examples of the urea salts of these inorganic acids are ortho-phosphoric acid urea salt, and phosphorous acid urea salt.

Of these, ortho-phosphoric acid, phosphorous acid, primary ammonium ortho-phosphate, secondary ammonium ortho-phosphate, primary ammonium phosphite, secondary ammonium phosphite and urea orthophosphate are especially preferred.

The aromatic polyamide shaped article having the above phosphorus-containing inorganic acid or its derivative adhered thereto and dried is then heat-treated at a temperature of about 300° C. to about 450° C. The post heat-treatment temperature is selected properly according to the type of the aromatic polyamide, the type and take-up of the phosphorus-containing inorganic acid or its derivative, and the heating time, etc. Employment of the heat-treatment temperature below about 300° C. does not serve to impart a satisfactory fire-proofness, but rather often results in products whose fire-proofness is not endurable against repeated washing. On the other hand, when temperatures higher than about 450° C. are employed, the physical properties of the aromatic polyamide shaped article are markedly deteriorated. The heating time can be varied suitably according to the heating temperature, the type of the aromatic polyamide, the type of the shaped article, the type and amount of the phosphorus-containing inorganic acid or its derivative adhered to the shaped article, or the heating means, etc. Preferably, the heating time is less than about 60 minutes.

There is no particular restriction on the heating means, and any desired heating means, such as hot air heating, infrared heating, oven heating or hot plate heating, can be chosen suitably according to the type of the shaped article or the heating time, etc. These heating means can also be used in combination with each other. For example, in the case of staple fibers or fabrics of poly(m-phenylene isophthalamide), post heat-treatment is preferably carried out in a heating oven kept at a temperature of about 330° to about 370° C. for about 5 to about 60 minutes. When the shaped article is a continuous filament, tow or yarn of poly(m-phenylene isophthalamide), post heat-treatment is preferably carried out on hot plate kept at about 330° to about 380° C. for about 3 seconds to about 30 seconds.

In the process of this invention, the above post heat-treatment can be carried out either in air or in an atmosphere of an inert gas such as nitrogen.

The aromatic polyamide shaped article obtained by the process of this invention is solvent insoluble, especially insoluble in concentrated sulfuric acid, and possesses superior fire-proofness based on the phosphorus atom contained in the aromatic polyamide. In addition, even in a free flame, the shaped article does not exhibit disadvantageous phenomena such as shrinking or melt-adhesion. The fire- or flame-proofness imparted by the method of this invention is permanent, and is not appreciably reduced by such operations as washing with water or extraction with an organic solvent. We assume that the phosphorus-containing inorganic acid and/or its derivative adhered to the aromatic polyamide shaped article undergoes a chemical reaction with the polymer, and as a result, both the polymer and the treating agent change chemically.

Accordingly, the shaped articles of polyamides treated in accordance with this invention are favorably utilized in uses which require incessant contact with water.

Since the aromatic polyamide shaped article used in this invention develops a unique color (yellowish brown to dark brown) during its heat-treatment, the treating condition can be easily known from the coloration.

As described hereinabove, the process of this invention makes it possible to impart permanent fire- and flame-proofness and solvent resistance, especially resistance to sulfuric acid, to the shaped article based on the chemical change of the shaped article, by an essential combination of a step of impregnating an aqueous solution of the specific phosphorus-containing inorganic acid or its derivative in a low concentration into the shaped article, with a step of post heat-treating the shaped article at elevated temperatures.

Accordingly, the aromatic polyamide shaped articles so treated find a wide range of applications, such as filter bags, ironing stand coverings, fire-protecting clothings, electrically insulating materials, curtains, wall materials, indoor finishing or decorative materials, or finishing materials for furniture.

The following Examples and Comparative Examples illustrate the process of this invention in greater detail.

The fire-proofness, acid resistance, tenacity strength retention, generation of noxious gases, and fire-proofness retention (washing resistance) were tested and evaluated by the following methods.

1. FIRE-PROOFNESS

A. LOI value [JIS K7201 (1972) B, No. 1]

The limiting oxygen index (LOI for short) shows the minimum limit of oxygen concentration required for a given material to go on burning, and is calculated from the following equation.

$$\text{LOI value} = \frac{100 \times O_2}{N_2 + O_2}$$

wherein $O_2$ is the amount of oxygen (by volume) in an oxygen-nitrogen mixed gaseous stream used in a combustion test, and $N_2$ is the amount of nitrogen (by volume) in the same mixture. Large LOI values show better fire-proofness. Specifically, the combustion test is performed as follows: The material is burned using a gaseous mixture of oxygen and nitrogen of varying mixing ratios, and the minimum oxygen concentration at which the material goes on burning is determined. This method is not so much affected by, for example, the form of the material, and is simple. Thus, it is frequently used to determine fire-proofness.

B. Observation by the naked eye

A sample is accomodated in a stainless steel wire gauze located at the outer portion of a flame of a propane gas burner, and the state of burning is observed by the naked eye. The evaluation is made on the following scale. Smaller grade numbers show better fire-proofness.

Grade 1: Carbonized without burning; not shrunken nor melt-adhered.
Grade 2: Carbonized without burning; slightly shrunken and/or melt-adhered.
Grade 3: Carbonized without burning; shrunken and/or melt-adhered to a greater extent than in Grade 2.
Grade 4: Burned; greatly shrunken and/or melt-adhered.
Grade 5: Burned; considerably shrunken and/or melt-adhered.

2. ACID RESISTANCE

A sample ($W_0$ grams) is immersed in 98% conc. sulfuric acid, and with occasional stirring, treated for 24 hours at room temperature. The solid portion of the sample is then withdrawn, and washed with water at room temperature. It is dried with hot air held at 120° C., and weighed ($W_1$ grams). The acid resistance (%) is calculated from the following equation.

$$\text{Acid resistance (\%)} = W_1/W_0 \times 100$$

Larger values show better acid resistance. The acid resistance of 100% shows that the sample is completely insoluble in the sulfuric acid, and the acid resistance of 0% shows that the sample is completely soluble in it.

When the sample remains solid after the 24 hour immersion treatment, it is observed by the naked eye. If it is apparently swollen, the note "(swollen)" is attached in the following tables after the figure showing the acid resistance value.

3. STRENGTH RETENTION

The strength means the tensile strength of a sample, and is measured by means of an Instron tensile tester (gauge length 5 cm, rate of elongation 100%/min.) (in the case of a fabric, the tensile strength is an average of the tensile strengths of the warp and the weft). The strength retention is expressed by the percentage of the strength ($T_1$) of the sample after impregnation of the treating agent and drying based on the strength ($T_0$) of the sample before the treatment, or the percentage of the strength ($T_2$) of the sample after post-heat treatment based on the initial strength ($T_0$). These strength retentions are termed dry strength retention, respectively, and are expressed by the following equations.

$$\text{Dry strength retention} = \frac{100 \times T_1}{T_0} (\%)$$

$$\text{Strength retention} = \frac{100 \times T_2}{T_0} (\%)$$

4. EVOLUTION OF NOXIOUS GASES

An openable closed receptacle having a capacity of about 13 liters and equipped with a thermocouple-including small-sized electric heater, a fan, a thermometer and a gas detector is used. 100 mg of a sample is accomodated in a stainless steel boat and placed on the electric heater. After closing the receptacle, the temperature of the electric heater is regulated while detecting the heating temperature by means of the thermocouple. The sample is heated for 20 minutes while maintaining the heating temperature at 700° C. Of the gases evolved, $Cl_2$ gas, $SO_2$ gas and $PH_3$ gas which are considered to have resulted from various chemical treatments are detected and quantitatively determined by a Kitagawa-type gas detector. The allowability of the gases for the health of the working personnel is also evaluated on the following standards.

$Cl_2$ gas: "not allowable" when the concentration is more than 1 ppm.

$SO_2$ gas: "not allowable" when the concentration is more than 5 ppm.

$PH_3$ gas: "not allowable" when the concentration is more than 0.3 ppm.

When the concentrations of these gases are below the above-mentioned limits or the gases are not generated, these are deemed "allowable."

5. RETENTION OF FIRE-PROOFNESS (LAUNDERING RESISTANCE)

5 g of a sample is immersed for 10 minutes in 1 liter of water with occasional washing by rubbing. Then, the sample is withdrawn from water, and thoroughly squeezed. The water is then exchanged with fresh one, and the same procedure is repeated. This washing procedure is repeated 10 times, and the sample is well dried in a hot air dryer at 120° C. Then, the LOI value of the sample is measured. The fire-proofness retention is defined by the following equation.

$$\text{Fire-proofness retention (\%)} = \frac{100 \times [(LOI-2) - (LOI-0)]}{[(LOI-1) - (LOI-0)]}$$

wherein LOI-0 is the LOI value of the sample before treatment; LOI-1 is the LOI value of the sample after the treatment and before the washing; and LOI-2 is the LOI value of the sample after the treatment and the washing.

EXAMPLES 1 TO 9 AND COMPARATIVE EXAMPLES 1 TO 13

A cloth made of poly(m-phenylene isophthalamide) fibers was immersed in an aqueous solution of ortho-phosphoric acid of the varying concentrations shown in Table 1, squeezed by a mangle, and then dried in a hot air dryer held at the varying temperatures shown in Table 1. The take-up of the ortho-phosphoric acid after drying (shown by the weight increase in % based on the weight of the original cloth) was measured. The dry strength retention was also determined. The dried cloth was then post heat-treated at the varying temperatures for the varying periods of the time shown in Table 1. The results are shown in Table 1 together with comparisons which did not meet the requirements of the process of this invention.

Table 1-(1)

| Examples (Ex.) & Comparative Examples (Comp.) | Treatment with o-phosphoric acid | | | | Post heat-treatment | |
|---|---|---|---|---|---|---|
| | Concentration (%) | Drying temperature (°C) | Take-up (%) | Dry strength retention (%) | Temperature (°C) | Time (minutes) |
| Comp. 1 | 1  | 120 | 0.2 | 99 | 350 | 30 |
| Ex. 1   | 5  | 120 | 2.6 | 96 | 350 | 30 |
| Ex. 2   | 10 | 120 | 5.8 | 90 | 350 | 60 |
| Ex. 3   | 20 | 100 | 13  | 74 | 330 | 60 |
| Ex. 4   | 25 | 80  | 16  | 68 | 370 | 10 |
| Comp. 2 | 35 | 80  | 28  | 53 | 370 | 10 |
| Comp. 3 | 85 | 80  | 120 | 20 | 370 | 10 |
| Comp. 4 | 10 | 140 | 5.5 | 85 | 250 | 30 |

| Examples (Ex.) & Comparative Examples (Comp.) | Properties of Products | | | | | | |
|---|---|---|---|---|---|---|---|
| | (1) Fire-proofness | | (2) Acid resistance (%) | (3) strength retention (%) | (4) Evolution of gases | | (5) Fire-proofness retention (%) |
| | (A) LOI value | (B) Grade | | | Kinds | Amount (ppm) Allowability | |
| Comp. 1 | 36 | 3-4 | 33 | 91 | Not detected | Yes | 100 |
| Ex. 1   | 43 | 1-2 | 75 | 67 | " | " | 100 |
| Ex. 2   | 48 | 1   | 84 | 59 | " | " | 100 |
| Ex. 3   | 53 | 1   | 75 | 45 | " | " | 92 |
| Ex. 4   | 56 | 1   | 75 | 42 | " | " | 81* |
| Comp. 2 | 60 | 1   | 65 | 26 | " | " | 77* |
| Comp. 3 | 68 | 1   | 60 | 18 | " | " | 74* |
| Comp. 4 | 49 | 3   | 0  | 63 | " | " | 15 |

*(in Table 1-(1))
When the tested sample was again tested by the same procedure, the sample showed a fire-proofness retention of at least 90% based on the fire-proofness of the tested material.

Table 1-(2)

| Examples (Ex.) & Comparative Examples (Comp.) | Treatment with O-phosphoric acid | | | | Post heat treatment | |
|---|---|---|---|---|---|---|
| | Concentration (%) | Drying temperature (°C) | Take-up (%) | Dry strength retention (%) | Temperature (°C) | Time (minutes) |
| Ex. 5 | 10 | 140 | 5.5 | 85 | 350 | 30 |
| Ex. 6 | 20 | 100 | 13  | 74 | 400 | 5 |

Table 1-(2)-continued

| | | | | | | |
|---|---|---|---|---|---|---|
| Comp. 5 | 20 | 100 | 13 | 74 | 500 | 5 |
| Ex. 7 | 15 | 120 | 8.5 | 81 | 350 | 30 |
| Comp. 6 | 15 | 200 | 8.5 | 63 | 350 | 30 |
| Comp. 7 | 15 | 120 | 8.5 | 81 | — | — |
| Comp. 8 | — | — | — | — | 350 | 30 |

| Examples (Ex.) & Comparative Examples (Comp.) | Properties of Products | | | | | | |
|---|---|---|---|---|---|---|---|
| | (1) Fire-proofness | | (2) Acid resistance (%) | (3) Strength retention (%) | (4) Evolution of gases | | (5) Fire-proofness retention (%) |
| | (A) LOI value | (B) Grade | | | Kinds | Amount (ppm) | Allow-ability | |
| Ex. 5 | 48 | 1 | 78 | 58 | Not detected | | Yes | 100 |
| Ex. 6 | 51 | 1 | 78 | 43 | " | | " | 91 |
| Comp. 5 | 50 | 1 | 81 | 12 | " | | " | 95 |
| Ex. 7 | 50 | 1 | 83 | 53 | " | | " | 100 |
| Comp. 6 | 51 | 1 | 85 | 23 | " | | " | 100 |
| Comp. 7 | 51 | 3 | 0 | 81 | " | | " | 9.1 |
| Comp. 8 | 30 | 5 | 19 (swollen) | 83 | " | | " | — |

Table 1-(3)

| Examples (Ex.) & Comparative Examples (Comp.) | Treatment with o-phosphoric acid | | | | Post heat treatment | |
|---|---|---|---|---|---|---|
| | Concentration (%) | Drying temperature (°C) | Take-up (%) | Dry strength retention (%) | Temperature (°C) | Time (minutes) |
| Comp. 9 | Durette (tradename) produced by the process of U. S. Pat. No. 3,607,798 using Cl₂ in gaseous phase | | | | | |
| Comp. 10 | The cloth was immersed in molten S at 250° C., and then heated at 360° C. for 60 minutes in nitrogen (after heat-treatment excess sulfur was extracted with toluene.) | | | | | |
| Comp. 11 | Heated at 370° C for 40 minutes using a gaseous mixture obtained by blowing 0.5 /min. of N₂ gas into S₂Cl₂ at 74° C | | | | | |
| Comp. 12 | Heated at 370° C. for 20 minutes using a gaseous mixture obtained by blowing 0.5 /min. of N₂ gas into PCl₃ at 84° C. | | | | | |
| Comp. 13 | Heated at 370° C. for 20 minutes using a gaseous mixture obtained by blowing 0.5 /min. of N₂ gas into SOCl₂. | | | | | |
| Ex. 8 | H₃PO₄ (15%) | 120 | 8.3 | 83 | 350 | 30 |
| Ex. 9 | H₃PO₃ (15 %) | 120 | 8.6 | 88 | 350 | 10 |

| Examples (Ex.) & Comparative Examples (Comp.) | Properties of Products | | | | | | |
|---|---|---|---|---|---|---|---|
| | (1) Fire-proofness | | (2) Acid resistance (%) | (3) Strength retention (%) | Evolution of gases | | (5) Fire-proofness retention (%) |
| | (A) LOI value | (B) Grade | | | Kinds | Amount (ppm) | Allow-ability | |
| Comp. 9 | 35 | 3 | 60 | 51 | Cl₂ | 10 | No | 100 |
| Comp. 10 | 38 | 1 | 85 | 5 | SO₂ | 1000 | " | 89 |
| Comp. 11 | 36 | 2 | 80 | 53 | SO₂ Cl₂ | 15 1 | " " | 100 |
| Comp. 12 | 39 | 3 | 65 | 45 | Cl₂ | 5 | " | 90 |
| Comp. 13 | 35 | 4 | 55 (swollen) | 48 | SO₂ Cl₂ | 1 5 | " " | 100 |
| Ex. 8 | 50 | 1 | 80 | 51 | Not detected | | Yes | 95 |
| Ex. 9 | 49 | 1 | 92 | 62 | " | | " | 100 |

EXAMPLES 10 TO 24

Each of the aromatic polyamide shaped articles shown in Table 2 was treated under the conditions shown in Table 2 (except as noted below) using various treating agents shown in Table 2, and then post heat-treated under the conditions shown in Table 2. The results are shown in Table 2.

In Example 12, the treating agent was dissolved in a concentration of 5.0% by weight in an N-methylpyrrolidone containing 20% by weight of poly(m-phenylene isophthalamide). The resulting dope was coated on a glass plate using a doctor knife, and dried at 140° C. for 2 hours. The coated glass plate was immersed in water to remove the solvent thoroughly. Then, it was dried at 120° C. for 2 hours, and a resulting film having a thickness of 30 microns was post-heat treated under the conditions shown in Table 2.

In Examples 19 and 20, a 50 cm long steel hot plate was used as a heat source instead of the hot air dryer.

Table 2-(1)

| Examples | Shaped article of aromatic polyamide | Treatment with a treating agent | | | | Post heat-treatment | |
|---|---|---|---|---|---|---|---|
| | | Kind | Concentration (%) | Drying temperature (°C) | Take-up (%) | Temperature (°C) | Time (minutes) |

Table 2-(1)-continued

| Example | Shaped article | Kind | Concentration (%) | Drying temperature (°C) | Take-up (%) | Temperature (°C) | Time (minutes) |
|---|---|---|---|---|---|---|---|
| 10 | +NH—⟨O⟩—CH$_2$—⟨O⟩—N(CO)$_2$⟨O⟩CO+$_n$ fabric | H$_3$PO$_4$ | 10 | 110 | 3.5 | 350 | 30 |
| 11 | +CO—⟨O⟩—CONH—⟨O⟩—NH+$_n$ filament | H$_3$PO$_3$ | 15 | 110 | 8.6 | " | " |
| 12 | +CO—⟨O⟩—CONH—⟨O⟩—NH+$_n$ film | " | — | — | 5.0 | " | 10 |
| 13 | +CO—⟨O⟩—CONH—⟨O⟩—NH+$_n$ fabric | " | 5 | 110 | 2.3 | 370 | 5 |
| 14 | " | (NH$_4$)H$_2$PO$_4$ | 10 | " | 7.0 | 350 | 30 |
| 15 | " | H$_3$PO$_4$NH$_2$CONH$_2$ | " | " | 6.1 | " | " |
| 16 | " | (H$_3$C)$_2$NH$_2$H$_2$PO$_3$ | " | " | 5.7 | " | " |

Properties of the Products

| Examples | (1) Fire-proofness (A) LOI value | (1) Fire-proofness (B) Grade | (2) Acid resistance (%) | (3) Strength retention (%) | (4) Evolution of noxious gases Kind | (4) Amount (ppm) | (4) Allowability | (5) Fire-proofness retention (%) |
|---|---|---|---|---|---|---|---|---|
| 10 | 45 | 1 | 81 | 71 | Not detected | | Yes | 100 |
| 11 | 52 | " | 93 | 68 | PH$_3$ | below 0.1 | " | 100 |
| 12 | 51 | " | 97 | 78 | " | " | " | 100 |
| 13 | 43 | " | 92 | 73 | PH$_3$ | below 0.1 | " | 100 |
| 14 | 49 | " | 78 | 55 | Not detected | | " | 100 |
| 15 | 46 | " | 79 | 61 | " | | " | 100 |
| 16 | 46 | 2 | 75 | 63 | " | | " | 100 |

Table 2-(2)

| Examples | Shaped article of aromatic polyamide | Kind | Concentration (%) | Drying temperature (°C) | Take-up (%) | Temperature (°C) | Time (minutes) |
|---|---|---|---|---|---|---|---|
| 17 | +CO—⟨O⟩—CONH—⟨O⟩—NH+$_n$ fabric | H$_6$P$_4$O$_{13}$ | 10 | 110 | 7.8 | 370 | 5 |
| 18 | " | H$_3$PO$_2$ | " | " | 4.3 | " | 15 |
| 19 | +CO—⟨O⟩—CONH—⟨O⟩—NH+$_n$ filament | H$_3$PO$_4$ | " | 90 | 2.6 | 370 | 1/3 |
| 20 | " | H$_3$PO$_3$ | " | " | 3.2 | " | 1/6 |
| 21 | +CO—⟨O⟩—CONH—⟨O⟩—NH+$_n$ fabric | NH$_4$H$_2$PO$_3$ | " | 110 | 5.8 | 350 | 30 |
| 22 | " | (NH$_4$)$_3$PO$_4$ | " | " | 5.3 | " | " |
| 23 | +CO—⟨O⟩—NH+$_n$ filament | H$_3$PO$_3$ | 15 | 110 | 7.3 | " | " |
| 24 | +CO—⟨O⟩—CONH—⟨O⟩+$_n$ filament | H$_3$PO$_4$ | " | 110 | 8.5 | " | " |

Properties of the products

| Examples | (1) Fire-proofness (A) LOI value | (1) Fire-proofness (B) Grade | (2) Acid resistance (%) | (3) Strength retention (%) | (4) Evolution of noxious gases Kind | (4) Amount (ppm) | (4) Allowability | (5) Fire-proofness retention (%) |
|---|---|---|---|---|---|---|---|---|
| 17 | 49 | 1 | 81 | 40 | Not detected | | Yes | 85* |
| 18 | 43 | 2 | 76 | 78 | PH$_3$ | 0.2 | " | 100 |
| 19 | 45 | 2 | 59 | 65 | Not detected | | " | 94 |
| 20 | 43 | 1 | 67 | 67 | PH$_3$ | 0.1 | " | 100 |
| 21 | 48 | 1 | 85 | 65 | PH$_3$ | below 0.1 | " | 100 |
| 22 | 48 | 1 | 76 | 58 | Not detected | | " | 100 |
| 23 | 49 | 1 | 91 | 71 | PH$_3$ | below 0.1 | " | 100 |

Table 2 -(2)-continued

| 24 | 51 | 1 | 83 | 63 | Not detected | " | 95 |

*Same as the footnote to Table 1.

What we claim is:

1. In a process for fire-proofing treatment of shaped articles of aromatic polyamides by contacting a shaped article of an aromatic polyamide with an aqueous solution of a phosphorus-containing inorganic compound free from halogen and sulfur, drying it and then post heat-treating it; the improvement which comprises contacting said shaped article with an aqueous solution of a halogen- and sulfur-free, phosphorus-containing inoranic acid or an ammonium, amine or urea salt thereof as a treating agent, said treating agent being selected from the group consisting of ortho-phosphoric acid, phosphorous acid, polyphosphoric acid, pyrophosphoric acid, hypophosphorous acid, ammonium dihydrogen orthophosphate, ammonium hydrogen phosphite, ammonium polyphosphate, ortho-phosphoric acid dihydrogen dimethylamine salt, ortho-phosphoric acid dihydrogen n-butylamine salt, ortho-phosphoric acid dihydrogen hexamethylene diamine salt, phosphorous acid dihydrogen aniline salt, polyphosphoric acid dimethylamine salt, urea ortho-phosphate and urea phosphite in a concentration of about 2% to about 30% by weight, drying said treated shaped article at a temperature of not more than about 150° C. and then post heat-treating said shaped article at a temperature of about 300° C. to about 450° C. in air or in an atmosphere of an inert gas.

2. The process of claim 1 wherein said treating compound is ortho-phosphoric acid.

3. The process of claim 1 wherein said aromatic polyamide is selected from the group consisting of poly(m-phenylene-isophthalamide), poly(m-phenylene terephthalamide), poly(p-phenylene terephthalamide), poly(p-benzamide), copoly(m-phenylene isophthalamide.terephthalmide), copoly(m-phenylene p-phenylene.isophthalamide), and copoly(m,p-benzamide).

4. The process of claim 1 wherein the take-up of said treating compound is about 0.5 to about 20% by weight based on the weight of the shaped article.

5. The process of claim 1 wherein said post heat-treatment is carried out for a period of not more than about 60 minutes.

6. The process of claim 1 wherein said shaped article is in the form of film, sheet, fiber, filament, tow, yarn or fabric.

7. The process of claim 1 wherein said treating compound is selected from the group consisting of ortho-phosphoric acid, phosphorous acid, primary ammonium ortho-phosphate primary ammonium phosphite, secondary ammonium phosphite and urea ortho-phosphate.

* * * * *